(12) United States Patent
Hosotani

(10) Patent No.: US 10,756,577 B2
(45) Date of Patent: Aug. 25, 2020

(54) WIRELESS POWER SUPPLY SYSTEM, WIRELESS POWER TRANSMISSION DEVICE, AND WIRELESS POWER RECEPTION DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 159 days.

(21) Appl. No.: 16/195,497

(22) Filed: Nov. 19, 2018

(65) Prior Publication Data
US 2019/0089200 A1   Mar. 21, 2019

Related U.S. Application Data

(63) Continuation of application No. PCT/JP2017/020543, filed on Jun. 2, 2017.

(30) Foreign Application Priority Data

Jun. 6, 2016  (JP) ................................ 2016-112336

(51) Int. Cl.
*H02J 50/12* (2016.01)
*H02J 50/80* (2016.01)
(Continued)

(52) U.S. Cl.
CPC .............. *H02J 50/12* (2016.02); *H02J 50/80* (2016.02); *H02M 1/14* (2013.01); *H02M 7/217* (2013.01)

(58) Field of Classification Search
CPC ......... H02J 7/025; H02J 5/005; B60L 11/182; H04B 5/0037; H04B 5/0031;
(Continued)

(56) References Cited

U.S. PATENT DOCUMENTS

| 2008/0079396 A1* | 4/2008 | Yamazaki | ............. | H01M 10/44 320/128 |
| 2011/0235800 A1* | 9/2011 | Furukawa | ............... | H02J 5/005 380/33 |

(Continued)

FOREIGN PATENT DOCUMENTS

| JP | H11-187582 A | 7/1999 |
| JP | 2002-209344 A | 7/2002 |

(Continued)

OTHER PUBLICATIONS

International Search Report issued in PCT/JP2017/020543; dated Jul. 11, 2017.

(Continued)

*Primary Examiner* — Rexford N Barnie
*Assistant Examiner* — Swarna N Chowdhuri
(74) *Attorney, Agent, or Firm* — Studebaker & Brackett PC

(57) ABSTRACT

A wireless power supply system includes a power transmission device and a power reception device. A control circuit in the power transmission device causes a power transmission circuit to operate, by a pulse-density modulation control method of controlling density of oscillation pulses for a predetermined period of time, in relationship De1>De2>De3, where De1 indicates the pulse density determined on the basis of a result of demodulation of a transmission signal from the power reception device, De2 indicates the pulse density in a state where a detected output value from the power transmission circuit reaches a predetermined value, and De3 indicates the pulse density in a state where a detected temperature values of a switch element reaches a predetermined value.

14 Claims, 9 Drawing Sheets

(51) Int. Cl.
*H02M 1/14* (2006.01)
*H02M 7/217* (2006.01)

(58) Field of Classification Search
CPC ... H04B 5/0081; H04B 5/0087; Y02T 90/122; H01F 38/14; H01F 2038/143
USPC ......................................................... 307/104
See application file for complete search history.

(56) References Cited

U.S. PATENT DOCUMENTS

| | | | | |
|---|---|---|---|---|
| 2016/0064994 | A1* | 3/2016 | Ku | H04B 5/0037 |
| | | | | 307/104 |
| 2016/0094081 | A1* | 3/2016 | Lee | H02J 7/025 |
| | | | | 320/108 |
| 2016/0126754 | A1* | 5/2016 | Ichikawa | H02J 50/12 |
| | | | | 307/104 |

FOREIGN PATENT DOCUMENTS

| | | |
|---|---|---|
| JP | 2014-50271 A | 3/2014 |
| JP | 2014-117124 A | 6/2014 |
| JP | 2014-519798 A | 8/2014 |
| JP | 2014-180201 A | 9/2014 |
| JP | 2016-063694 A | 4/2016 |
| WO | 2013/042570 A1 | 3/2013 |

OTHER PUBLICATIONS

Written Opinion issued in PCT/JP2017/020543; dated Jul. 11, 2017.

* cited by examiner

WIRELESS POWER SUPPLY SYSTEM, WIRELESS POWER TRANSMISSION DEVICE, AND WIRELESS POWER RECEPTION DEVICE

CROSS-REFERENCE TO RELATED APPLICATIONS

This application claims benefit of priority to International Patent Application No. PCT/JP2017/020543, filed Jun. 2, 2017, and to Japanese Patent Application No. 2016-112336, filed Jun. 6, 2016, the entire contents of each are incorporated herein by reference.

BACKGROUND

Technical Field

The present disclosure relates to a wireless power supply system of wirelessly supplying high-frequency power from a power transmission device to a power reception device, and to a wireless power transmission device and a wireless power reception device included in the system.

Background Art

In a wireless power supply system of wirelessly supplying power from a power transmission device to a power reception device by magnetic-field coupling, the power transmission device includes a power transmission coil, and the power reception device includes a power reception coil. As one example of such a wireless power supply system, a wireless power supply system in which a power transmission coil and a power reception coil are also used in transmitting signals is described in International Publication No. 2013-042570.

In the wireless power supply system described in International Publication No. 2013-042570, a resonant frequency changing circuit connected to the power reception coil modulates the resonant frequency of a resonant circuit and thus superimposes a load modulation signal on a carrier wave, and a detector circuit in the power transmission device detects the modulation signal and thus receives a signal from the power reception device. The power transmission device appropriately controls supplied power in accordance with the signal from the power reception device.

SUMMARY

In a wireless power supply system, relative positions of the power transmission coil and power reception coil, the degree of coupling between the power transmission coil and power reception coil, the power consumption of load, the input voltage of the power transmission device, and other factors change independently. Thus, it is difficult to protect the power transmission circuit and power reception circuit from abnormal conditions and to efficiently supply power from the power transmission device to the power reception device.

Hitherto, compatibility between ensuring the safety and reliability and enhancing the efficiency by protecting the power transmission circuit and power reception circuit and increasing the efficiency of wireless power supply has not been substantially established.

The present disclosure thus provides a wireless power supply system that achieves ensuring the safety and reliability of the wireless power supply system and enhancing the efficiency of power supply and a wireless power transmission device and a wireless power reception device included in that system.

A wireless power supply system according to the present disclosure includes a power transmission device including a power transmission coil and a power transmission circuit configured to supply high-frequency power to the power transmission coil. The wireless power supply system further includes a power reception device including a power reception coil coupled to the power transmission coil, a power reception circuit configured to convert high-frequency power received by the power reception coil into direct-current power, and a load circuit configured to consume the direct-current power. The power reception device includes a load detection unit configured to detect a state of a load, a signal generation unit configured to generate a transmission signal to be directed to the power transmission device on the basis of a result of detection by the load detection unit, and a transmission-signal control circuit configured to transmit the transmission signal by using coupling between the power transmission coil and the power reception coil.

The power transmission device includes a demodulation circuit configured to demodulate the transmission signal, an output detection unit configured to detect power output by operation of the power transmission circuit, a temperature detection unit configured to detect temperature of a heating portion of the power transmission device, and a control circuit configured to control the power transmission circuit. The control circuit causes the power transmission circuit to operate, by using a pulse-density modulation control method of controlling a flow of power by changing density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in a state where a value detected by the output detection unit reaches a predetermined value, and De3 indicates the pulse density in a state where a value detected by the temperature detection unit reaches a predetermined value.

In the above-described configuration, while the power transmission circuit operates under the pulse-density modulation control method, in a state where the temperature detection unit reaches the predetermined temperature value (that is, when overheating is detected), the pulse density is most restricted, and in a state where the output detection unit reaches the predetermined output value (that is, the output reaches the upper limit), the pulse density is restricted next. In other states, the pulse density modulation control is performed on the power transmission circuit with the pulse density determined on the basis of a result of demodulation by the demodulation circuit.

Accordingly, an overheating state of the heating portion of the power transmission device or a state where the power transmission device is supplying excessive power is restricted, and in other normal states, the pulse density modulation is performed on the power transmission device with the pulse density based on feedback corresponding to a transmission signal from the power reception device. Therefore, the power is supplied with a high degree of efficiency.

The wireless power supply system may preferably further include a power transmission resonant capacitor constituting a power transmission resonant circuit together with the power transmission coil and a power reception resonant capacitor constituting a power reception resonant circuit together with the power reception coil. The signal generation unit may preferably include a resonance modulation circuit configured to change input impedance seen from the power transmission circuit toward the load circuit and switch a state where an electromagnetic resonance condition based on electromagnetic coupling between the power transmission resonant circuit and the power reception resonant circuit is satisfied or not. The demodulation circuit may preferably demodulate the transmission signal on the basis of a variable that varies in accordance with the state where the electromagnetic resonance condition is satisfied or not.

In the above-described configuration, even when the amplitude or phase of the resonance voltage in the power transmission resonant circuit fluctuates because of inconstant states of the power transmission device and power reception device, signals are transmitted from the power reception device to the power transmission device with high stability.

For example, the power reception circuit may include a rectifying and smoothing circuit configured to covert voltage occurring in the power reception coil into direct-current voltage, and the load detection unit may detect the state of the load on the basis of the direct-current voltage. In this configuration, the voltage supplied to the load is detected, and feedback to the power transmission device results in stabilizing the voltage supplied to the load.

For example, the control circuit may restrict oscillation by comparing the value detected by the temperature detection unit with a predetermined threshold in advance of restricting oscillation by comparing the value detected by the output detection unit with a predetermined output value. In this configuration, when protection from overheating is more important than protection from excessive power supply, the safety is more enhanced.

For example, the control circuit may restrict oscillation by comparing the value detected by the output detection unit with the predetermined output value in advance of restricting oscillation by comparing the value detected by the temperature detection unit with the predetermined temperature value. In this configuration, when protection from excessive power supply is more important than protection from overheating, the safety is more enhanced.

A wireless power transmission device according to the present disclosure constitutes a wireless power supply system together with a power reception device including a power reception coil, a power reception circuit configured to convert high-frequency power received by the power reception coil into direct-current power, a load circuit configured to consume the direct-current power, a load detection unit configured to detect a state of the load circuit, a signal generation unit configured to generate a transmission signal on the basis of a result of detection by the load detection unit, and a transmission-signal control circuit configured to transmit the transmission signal by using the power reception coil. The wireless power transmission device includes a power transmission coil coupled to the power reception coil, a power transmission circuit configured to supply high-frequency power to the power transmission coil, a demodulation circuit configured to demodulate the transmission signal, an output detection unit configured to detect power output by operation of the power transmission circuit, a temperature detection unit configured to detect temperature of a heating portion of the power transmission circuit, and a control circuit configured to control the power transmission circuit. The control circuit causes the power transmission circuit to operate, by using a pulse-density modulation control method of controlling a flow of power by changing density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in a state where a value detected by the output detection unit reaches a predetermined value, and De3 indicates the pulse density in a state where a value detected by the temperature detection unit reaches a predetermined value.

In the above-described configuration, an overheating state of the heating portion of the power transmission device or a state where the power transmission device is supplying excessive power is restricted, and in other normal states, the pulse density modulation is performed on the power transmission device with the pulse density based on feedback corresponding to a transmission signal from the power reception device. Therefore, the power is supplied with a high degree of efficiency.

A wireless power reception device according to the present disclosure constitutes a wireless power supply system together with a power transmission device including a power transmission coil, a power transmission resonant capacitor constituting a power transmission resonant circuit together with the power transmission coil, a power transmission circuit configured to supply high-frequency power to the power transmission coil, a demodulation circuit configured to demodulate a transmission signal, an output detection unit configured to detect power output by operation of the power transmission circuit, a temperature detection unit configured to detect temperature of a heating portion, and a control circuit. The control circuit is configured to cause the power transmission circuit to operate, by using a pulse-density modulation control method of controlling a flow of power by changing density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in a state where a value detected by the output detection unit reaches a predetermined value, and De3 indicates the pulse density in a state where a value detected by the temperature detection unit reaches a predetermined value.

The wireless power reception device includes a power reception coil coupled to the power transmission coil, a power reception resonant capacitor constituting a power reception resonant circuit together with the power reception coil, a power reception circuit configured to convert high-frequency power received by the power reception coil into direct-current power, a load circuit configured to consume the direct-current power, a load detection unit configured to detect a state of a load, a signal generation unit configured to generate the transmission signal to be directed to the power transmission device on the basis of a result of detection by the load detection unit, a transmission-signal control circuit configured to transmit the transmission signal by using coupling between the power transmission coil and the power reception coil, and a resonance modulation circuit configured to change input impedance seen from the power transmission circuit toward the load circuit and switch a state where an electromagnetic resonance condition based on electromagnetic coupling between the power transmission resonant circuit and the power reception resonant circuit is satisfied or not. The transmission-signal control circuit converts the transmission signal into an amount of change in the input impedance for a fixed period of time in temporal change and control the resonance modulation circuit.

In the above-described configuration, an overheating state of the heating portion of the power transmission device or a state where the power transmission device is supplying excessive power is restricted, and in other normal states, the pulse density modulation is performed on the power transmission device with the pulse density based on feedback corresponding to a transmission signal from the power reception device. Therefore, the power is supplied with a high degree of efficiency.

According to the present disclosure, a wireless power supply system that achieves ensuring the safety and reliability and enhancing the efficiency of the wireless power supply system and a wireless power transmission device and a wireless power reception device included in that system are obtainable.

DETAILED DESCRIPTION

Figure 1:
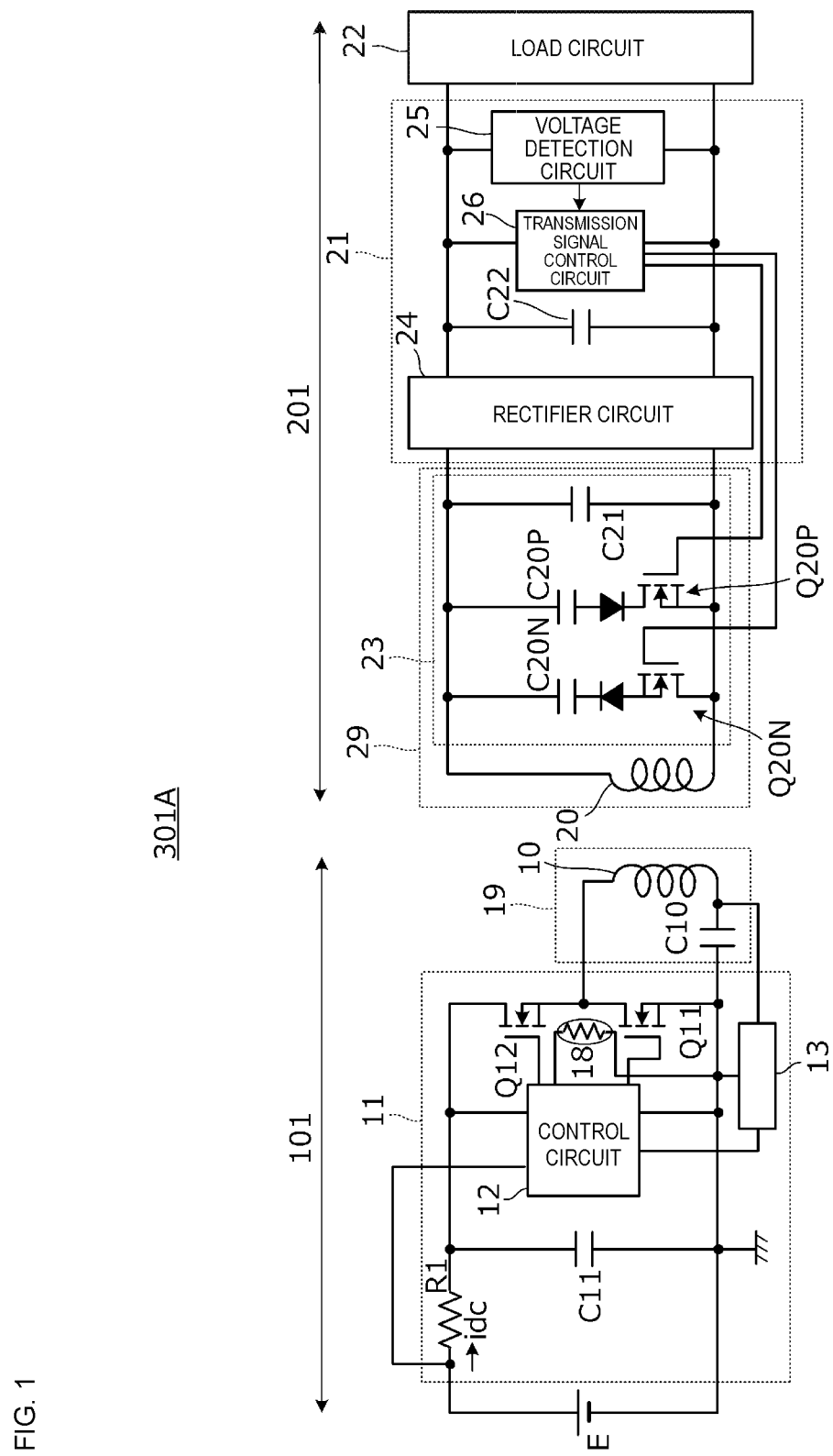
FIG. 1 is a circuit diagram of a wireless power transmission device, a wireless power reception device, and a wireless power supply system formed of them according to a first embodiment

A plurality of embodiments for carrying out the present disclosure are described below by using several specific examples with reference to drawings. The same reference numerals are used in the same areas in the drawings. In consideration of the explanation of main points or the facilitation of understanding, the embodiments are separately illustrated for the sake of convenience. The configurations illustrated in different embodiments may be replaced or combined in part. The description of items in the second and subsequent embodiments common to the first embodiment is omitted, and only different points are described. In particular, substantially the same operational advantages obtained from substantially the same configurations are not described in detail in each embodiment.

First Embodiment

FIG. 1 is a circuit diagram of a wireless power transmission device, a wireless power reception device, and a wireless power supply system formed of them according to a first embodiment. A wireless power supply system 301A is formed of a wireless power transmission device 101 and a wireless power reception device 201. The wireless power transmission device (hereinafter referred to simply as "power transmission device") 101 includes a power transmission resonant circuit 19 including a power transmission coil 10 and a resonant capacitor C10 and a power transmission circuit 11 configured to supply high-frequency power to the power transmission coil 10. The wireless power reception device (hereinafter referred to simply as "power reception device") 201 includes a power reception resonant circuit 29 including a power reception coil 20 magnetic-field coupled to the power transmission coil 10 and a resonant capacitor C21, a power reception circuit 21 configured to convert high-frequency power received by the power reception coil 20 into direct-current power, and a load circuit 22 configured to consume the direct-current power.

The power transmission resonant circuit 19 and power reception resonant circuit 29 are electromagnetically coupled to each other. In this electromagnetic coupling, the power transmission resonant circuit 19 and power reception resonant circuit 29, which are separately positioned, interact with each other by magnetic coupling, electric-field coupling, or combination thereof, the magnetic-field energy and electric-field energy of these resonant circuits are joined exchanged with each other, and vibration occurs.

In the power transmission resonant circuit 19, mainly between the power transmission coil 10 and power transmission resonant capacitor C10, the magnetic-field energy and electric-field energy of them are exchanged with each other, and electric vibration occurs. Similarly, in the power reception resonant circuit 29, mainly between the power reception coil 20 and power reception resonant capacitor C21, the magnetic-field energy and electric-field energy of them are exchanged with each other, and electric vibration occurs. When these elements satisfy an electromagnetic resonance condition, electromagnetic resonance is established.

The power reception device 201 includes a resonance modulation circuit 23 configured to switch a state in which the above-described electromagnetic resonance condition is satisfied or not by changing input impedance seen from the power transmission circuit 11 toward the load circuit 22. The power reception device 201 includes a transmission-signal control circuit 26 configured to convert a transmission signal into the amount of change in the above input impedance for a given period of time in temporal change and control the resonance modulation circuit 23.

In a state where the above electromagnetic resonance condition is satisfied, the imaginary part of the input impedance seen from the power transmission circuit 11 toward the load circuit (that is, input impedance seen from the power transmission side toward the power reception side at a switching frequency) is zero or near infinity. In a state where the electromagnetic resonance condition is not satisfied, the imaginary part of the above input impedance has a value.

As described below, the power transmission device 101 includes a modulation circuit configured to determine the state where the electromagnetic resonance condition is satisfied or not and demodulate the amount of change in the result of the determination for a given period of time in temporal change into a transmission signal.

The power transmission circuit 11 includes the control circuit 12, switch elements Q11 and Q12, capacitors C10 and C11, a current detection resistor R1, a temperature detection element 18, and a resonance-voltage detection circuit 13. The control circuit 12 turns on or off the switch elements Q11 and Q12. The power transmission coil 10 and capacitor C10 constitute the power transmission resonant circuit 19. The capacitor C11 stabilizes the input voltage and suppresses a harmonic component of voltage and current.

The control circuit 12 switches the switch elements Q11 and Q12 by pulse-density modulation (PDM), which controls the density of oscillation pulses for a predetermined period of time. By this switching of the switch elements Q11 and Q12, resonance current flows in the power transmission resonant circuit 19.

A resonant frequency f0 of resonant circuit 19 is a frequency suited for power supply and may be a frequency no less than 6 MHz and no more than 14 MHz. One specific example thereof may be 6.78 MHz, which is one of the ISM bands.

The temperature detection element 18 is in the vicinity of the switch elements Q11 and Q12 or in a position where it is thermally combined thereto. The control circuit 12 detects temperatures of the switch elements Q11 and Q12, which are heating elements, by using the temperature detection element 18. For example, when the temperature detection element 18 is a temperature-sensitive resistor element, such as thermistor, the control circuit 12 reads a voltage varying with a change in resistance value of the temperature detection element 18. A portion of the control circuit 12 that performs this processing corresponds to "temperature detection unit" according to the present disclosure.

An input direct current idc supplied from an input power source E flows through the current detection resistor R1 to the power transmission circuit 11. The control circuit 12 detects the input direct current idc supplied from the input power source E by reading a voltage drop caused by the current detection resistor R1. The input direct current idc is proportional to the magnitude of high-frequency current output by operation of the power transmission circuit 11.

The resonance-voltage detection circuit 13 detects resonance voltage of the resonant circuit formed of the power transmission coil 10 and resonant capacitor C10 and converts it into direct-current voltage proportional to the resonance voltage. This direct-current voltage is read by the control circuit 12.

The control circuit 12 detects a value corresponding to the magnitude of power output by operation of the power transmission circuit 11 on the basis of the above input direct current idc and direct-current voltage proportional to the resonance voltage. A portion of the control circuit 12 that performs this detection processing corresponds to "output detection unit" according to the present disclosure.

The power reception circuit 21 includes the above-described resonance modulation circuit 23, a rectifier circuit 24, a capacitor C22, a voltage detection circuit 25, and the above-described transmission-signal control circuit 26. The resonance modulation circuit 23 includes switch elements Q20P and Q20N and capacitors C20P, C20N, and C21. The power reception coil 20 and capacitors C20P, C20N, and C21 constitute the power reception resonant circuit 29. The capacitors C20P, C20N, and C21 are an example of "resonant capacitor" according to the present disclosure. When the switch elements Q20P and Q20N are in an off state, the resonant frequency of the power reception resonant circuit 29 is determined mainly by the capacitance of the capacitor C21 and the inductance of the power reception coil 20. When the switch elements Q20P and Q20N are in an on state, the resonant frequency of the power reception resonant circuit 29 is determined mainly by the parallel combined capacitance of the capacitors C20P, C20N, and C21 and the inductance of the power reception coil 20.

The rectifier circuit 24 rectifies resonance voltage of the above power reception resonant circuit 29, and the capacitor C22 smooths the rectified voltage. The voltage detection circuit 25 detects output voltage of the power reception circuit 21 (voltage supplied to the load circuit 22). The voltage detection circuit 25 is an example of "load detection unit" according to the present disclosure. The transmission-signal control circuit 26 switches the state of the switch elements Q20P and Q20N. This action switches the resonant frequency of the above-described power reception resonant circuit 29. Here, when the resonant frequency in the state where the switch elements Q20P and Q20N are in an off state is expressed as f1 and the resonant frequency in the state where the switch elements Q20P and Q20N are in an on state is expressed as f2, f1≠f2. The circuit constant is set such that the frequency f1 or frequency f2 is equal to the resonant frequency f0 of the power transmission resonant circuit 19.

In the case where the relationship f0=f1≠f2 is set, when the above switch elements Q20P and Q20N are in an off state, that is, when the resonant frequency of the resonance modulation circuit 23 is f1, the electromagnetic resonance condition is satisfied for the power transmission resonant circuit 19 and power reception resonant circuit 29. When the above switch elements Q20P and Q20N are in an on state, that is, when the resonant frequency of the power reception resonant circuit 29 is f2, the power transmission resonant circuit 19 and power reception resonant circuit 29 are not resonantly coupled to each other. That is, the electromagnetic resonance condition is not satisfied. In this way, by turning on or off the switch elements Q20P and Q20N, whether the above electromagnetic resonance condition is satisfied or not is determined. The transmission-signal control circuit 26 is an example of "signal generation unit" according to the present disclosure.

In the power transmission circuit 11, the amount of current supplied from the input power source E varies in accordance with the state where the above electromagnetic resonance condition is satisfied or not. In a state where electromagnetic resonance is established, the amount of energy supplied from the power transmission resonant circuit 19 to the power reception resonant circuit 29 is larger than that in a state where it is not established. That is, in the state where electromagnetic resonance is established, the amount of current supplied from the input power source E to the power transmission circuit 11 is larger than that in the state where it is not established.

The above control circuit 12 demodulates the above transmission signal by detecting the state where the above electromagnetic resonance condition is satisfied or not on the basis of the voltage drop of the above current detection resistor R1 or the output voltage of the resonance-voltage detection circuit 13. A portion of the control circuit 12 that performs this processing corresponds to "demodulation circuit" according to the present disclosure.

By the above-described action, the power reception device 201 transmits predetermined information (transmission signal) to the power transmission device 101.

The above control circuit 12 causes the power transmission circuit 11 to operate, by using the pulse-density modulation control method, which controls the flow of current by changing the density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in the state where a value detected by the output detection unit reaches a predetermined value, and De3 indicates the pulse density in the state where a value detected by the temperature detection unit reaches a predetermined value.

Figure 2:
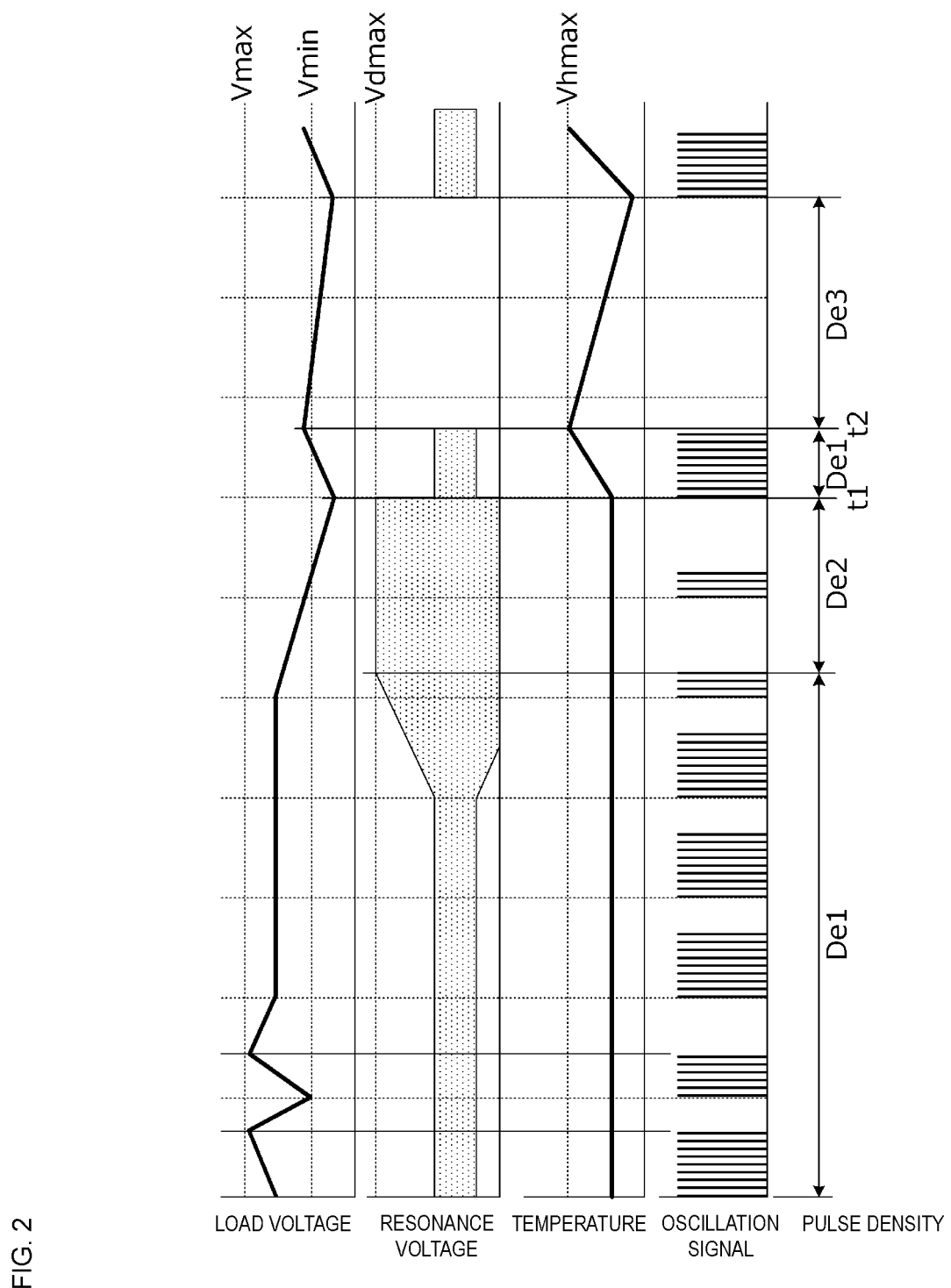
FIG. 2 illustrates an example of pulse-density modulation control by a control circuit.

FIG. 2 illustrates an example of pulse-density modulation control by the control circuit 12. In FIG. 2, "load voltage" is a voltage supplied to the load circuit 22, "resonance voltage" is a resonance voltage of the power transmission resonant circuit 19, "temperature" is a value detected by the temperature detection element 18, and "oscillation signal" is a gate signal of the switch element Q11 or Q12. The horizontal axis indicates elapsed time. As illustrated in FIG. 2, in a normal state, pulse-density modulation is performed such that the load voltage falls within the range of the lower limit Vmin to the upper limit Vmax. This feedback control stabilizes the load voltage. The pulse density in this normal state is the pulse density De1.

As further illustrated in FIG. 2, when the resonance voltage reaches the upper limit Vdmax, the pulse density is suppressed. The pulse density in the state where the resonance voltage reaches the upper limit Vdmax is the pulse density De2. When the temperature reaches the upper limit Vhmax, the pulse density is suppressed. The pulse density in the state where the temperature reaches the upper limit Vhmax is the pulse density De3. In the present embodiment, the pulse density De3 is zero. That is, at the pulse density De3, both the switch elements Q11 and Q12 are maintained in an off state. In the present embodiment, between the time t1 and t2, the resonance voltage is smaller than the upper limit Vdmax and the temperature is less than the upper limit Vhmax, and thus the pulse density between this period can also be expressed as the pulse density De1, which is in the normal state.

As described above, the control circuit 12 illustrated in FIG. 1 controls the density of pulses such that the relationship De1>De2>De3 is established. For example, the number of pulses for one predetermined period of time is 21,
De1=not less than 15/21 and not more than 21/21,
De2=3/21,
De3=0/21.

With this control, the pulse density is most restricted when overheating of the switch elements Q11 and Q12 is detected, and the pulse density is restricted next when the output reaches the upper limit. In other states, the pulse density modulation control is performed on the power transmission circuit with the pulse density determined on the basis of feedback from the power reception device. Accordingly, an overheating state of the heating portion of the power transmission device or a state where the power transmission device is supplying excessive power is restricted, and in other normal states, the pulse density modulation control is performed on the power transmission circuit with the pulse density based on feedback in accordance with a transmission signal from the power reception device. Thus, the power can be supplied with a high degree of efficiency.

Next, the details of processing in the power transmission device 101 and power reception device 201 illustrated in FIG. 1 are described with reference to flow charts.

Figure 3:
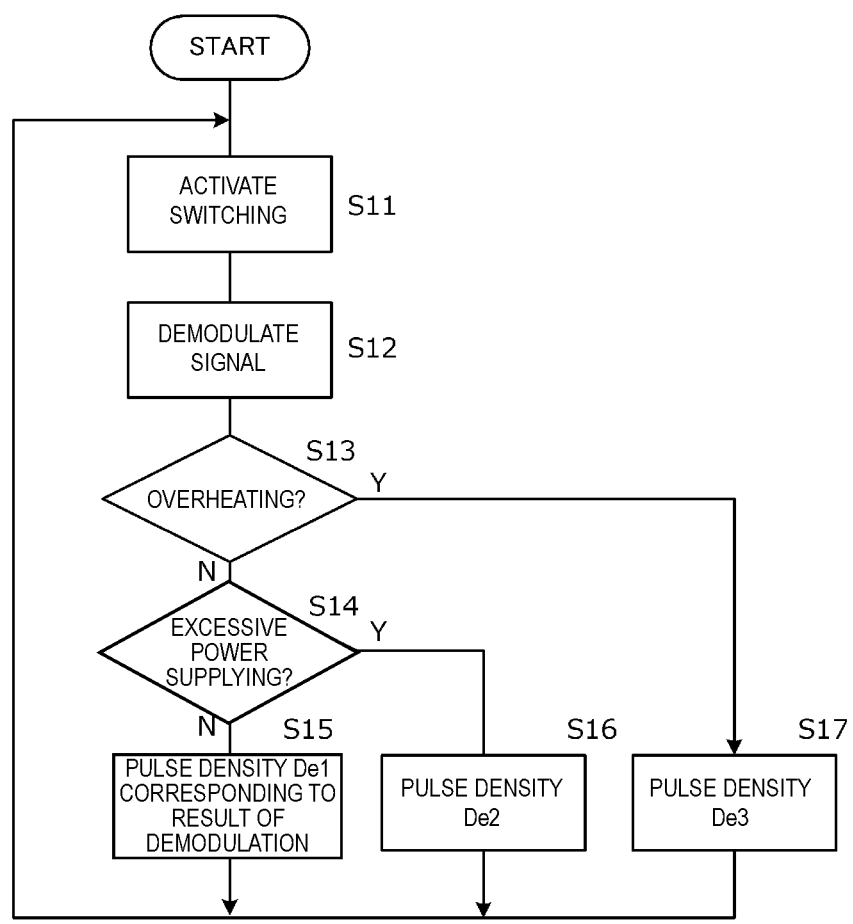
FIG. 3 is a flow chart that illustrates the details of processing by the control circuit in a power transmission device.

FIG. 3 is a flow chart that illustrates the details of processing by the control circuit 12 in the power transmission device 101. First, switching of the switch elements Q11 and Q12 starts, and wireless power supply from the power transmission device 101 to the power reception device 201 starts (S11). In this state, a transmission signal transmitted from the power reception device is demodulated (S12). The processing at this step S12 will be described below. Subsequently, it is determined whether the switch elements Q11 and Q12 are in an overheating state or not (S13). When they are not in the overheating state, it is determined whether the power transmission circuit 11 is in a state where it is supplying excessive power or not (S14). When it is not in the excessive power supplying state, the pulse density modulation control is performed on the switch elements Q11 and Q12 with the pulse density De1, which corresponds to a result of demodulation at step S12 (S15). In the overheating state, the pulse density modulation control is performed on the switch elements Q11 and Q12 with the pulse density De3 (S13 S17). In the excessive power supplying state, the pulse density modulation control is performed on the switch elements Q11 and Q12 with the pulse density De2 (S14 S16).

Figure 4:
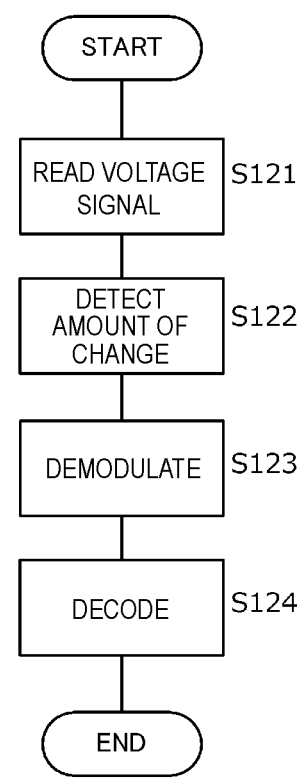
FIG. 4 is a flow chart that illustrates the details of processing, such as signal demodulation, in FIG. 3.

FIG. 4 is a flow chart that illustrates the details of processing at step S12 (signal demodulation) in FIG. 3. First, a voltage drop of the current detection resistor R1 is read (S121). This voltage drop is a variable that changes in accordance with the state where the electromagnetic resonance condition is satisfied or not. Subsequently, the amount of change being a difference between the variable at this time and the variable at the last time (S122). By comparing this amount of change with a predetermined threshold, that is, by binarization, a transmission signal is demodulated (S123). Then, it is decoded to code of a predetermined number of bits (S124).

Figure 5:
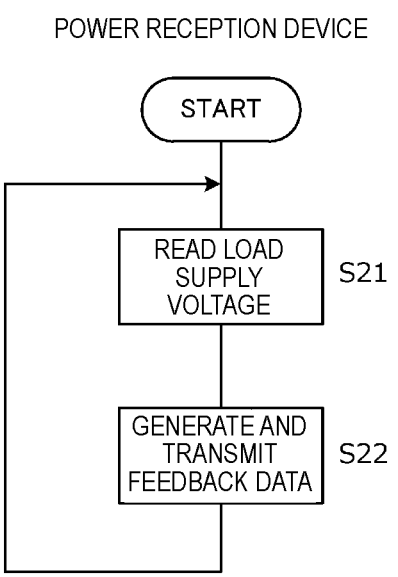
FIG. 5 is a flow chart that illustrates the details of processing by a transmission-signal control circuit in a power reception device.

FIG. 5 is a flow chart that illustrates the details of processing by the transmission-signal control circuit 26 in the power reception device 201. When power supply voltage not less than a specified value is applied on the transmission-signal control circuit 26 by power reception, the transmission-signal control circuit 26 starts operating. First, the transmission-signal control circuit 26 reads a load supply voltage, generates feedback data for making this voltage remain at the specified value, and transmits it to the power transmission device as a transmission signal (S21→S22). As previously described, the power transmission device 101 demodulates this transmission signal, decodes the feedback data, and appropriately adjusts the supplied power in accordance with it. By repeating steps S21 and S22, the received power is stabilized.

Figure 6:
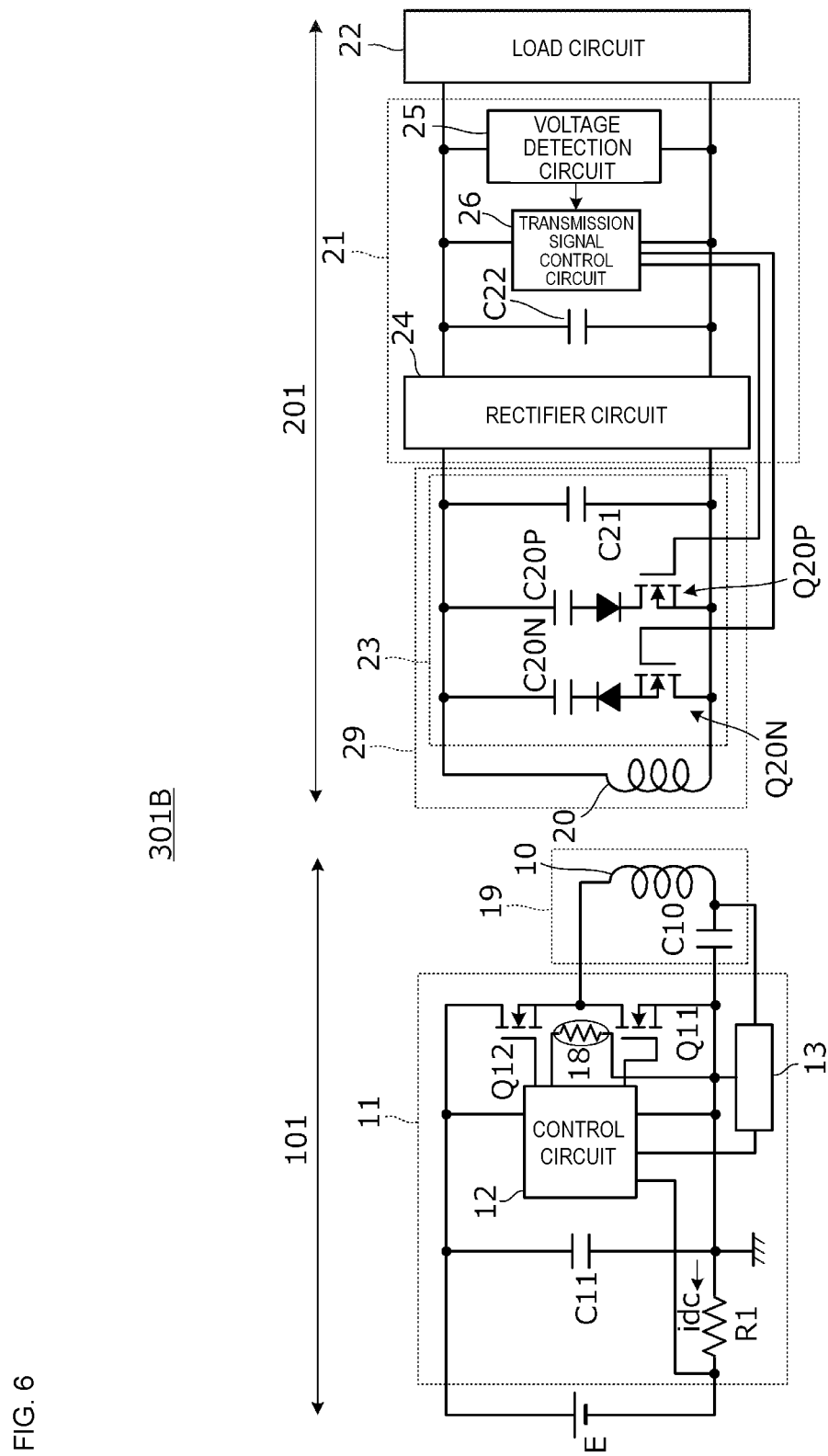
FIG. 6 is a circuit diagram of another wireless power supply system according to the first embodiment.

FIG. 6 is a circuit diagram of another wireless power supply system according to the present embodiment.

A wireless power supply system 301B includes the power transmission device 101 and power reception device 201. The power transmission device 101 in FIG. 6 differs from the power transmission device 101 illustrated in FIG. 1 in the position of the current detection resistor R1. The other configuration is the same as in FIG. 1. As illustrated, the current detection resistor R1 may be disposed in a ground line, and it may read a voltage drop of the current detection resistor R1.

According to the present embodiment, as illustrated in steps S13 and S14 in FIG. 3, because the determination about overheating is done before the determination about excessive power supply, protection from overheating has higher priority. Thus, in particular, the effects of protecting the switch elements Q11 and Q12 can be enhanced.

The system configuration executing processing in a flow driven manner is illustrated as the above-described embodiment. The system may be an event-driven configuration which executes processing by using a change in current or elapsed time as a trigger.

Second Embodiment

In a second embodiment, a wireless power supply system differing from the first embodiment in protection operation by the control circuit 12 is illustrated.

Figure 7:
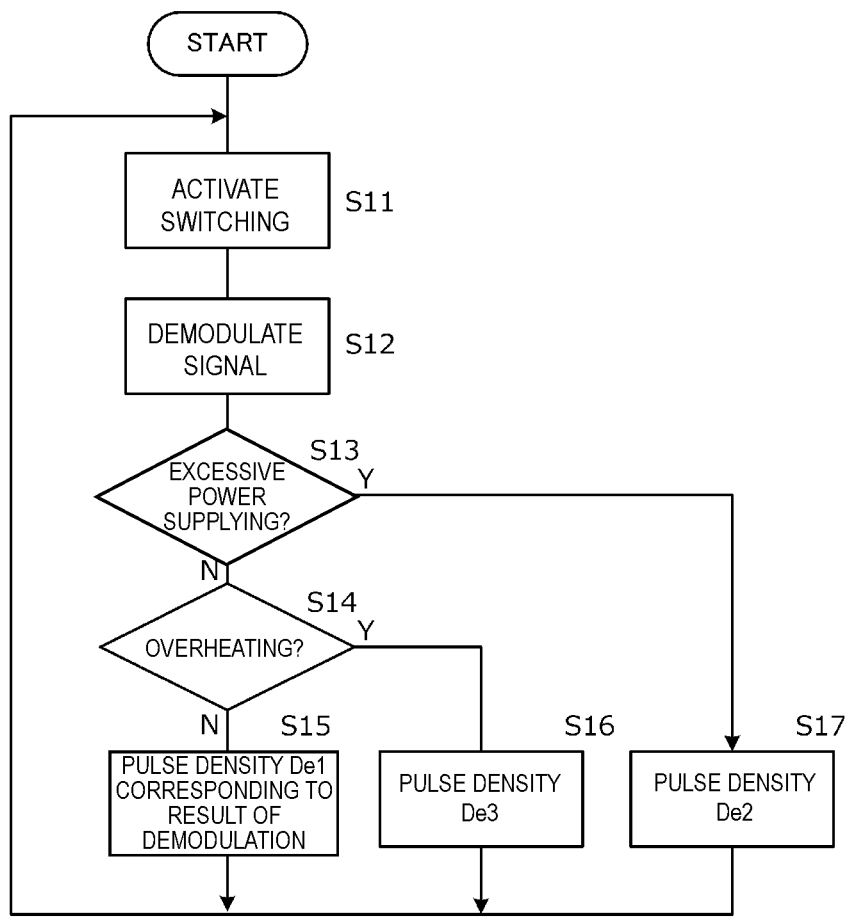
FIG. 7 is a flow chart that illustrates the details of processing by the control circuit in the power transmission device in a wireless power supply system according to a second embodiment.

The circuit configuration in the wireless power supply system according to the second embodiment is the same as that illustrated in FIG. 1. FIG. 7 is a flow chart that illustrates the details of processing by the control circuit 12 in the power transmission device 101. First, switching of the switch elements Q11 and Q12 starts, and wireless power supply from the power transmission device 101 to the power reception device 201 starts (S11). In this state, a transmission signal transmitted from the power reception device is demodulated (S12). Subsequently, it is determined whether the power transmission circuit 11 is in a state where it is supplying excessive power (S13). When it is not in the excessive power supplying state, it is determined whether the switch elements Q11 and Q12 are in an overheating state (S14). When they are not in the overheating state, the pulse-density modulation control is performed on the switch elements Q11 and Q12 with the pulse density De1, which corresponds to a result of demodulation at step S12 (S15). In the excessive power supplying state, the pulse-density modulation control is performed on the switch elements Q11 and Q12 with the pulse density De2 (S13→S17). In the overheating state, the pulse-density modulation control is performed on the switch elements Q11 and Q12 with the pulse density De3 (S14→S16).

This example differs from the example illustrated in the first embodiment in the order of the determination about overheating and the determination about excessive power supply. Because the determination about excessive power supply is done before the determination about overheating, protection from excessive power supply has higher priority. Thus, in particular, the degree of safety of the power transmission circuit 11 can be improved.

Third Embodiment

In a third embodiment, a wireless power supply system including a resonance modulation circuit having configuration differing from that in the first embodiment is illustrated.

Figure 8:
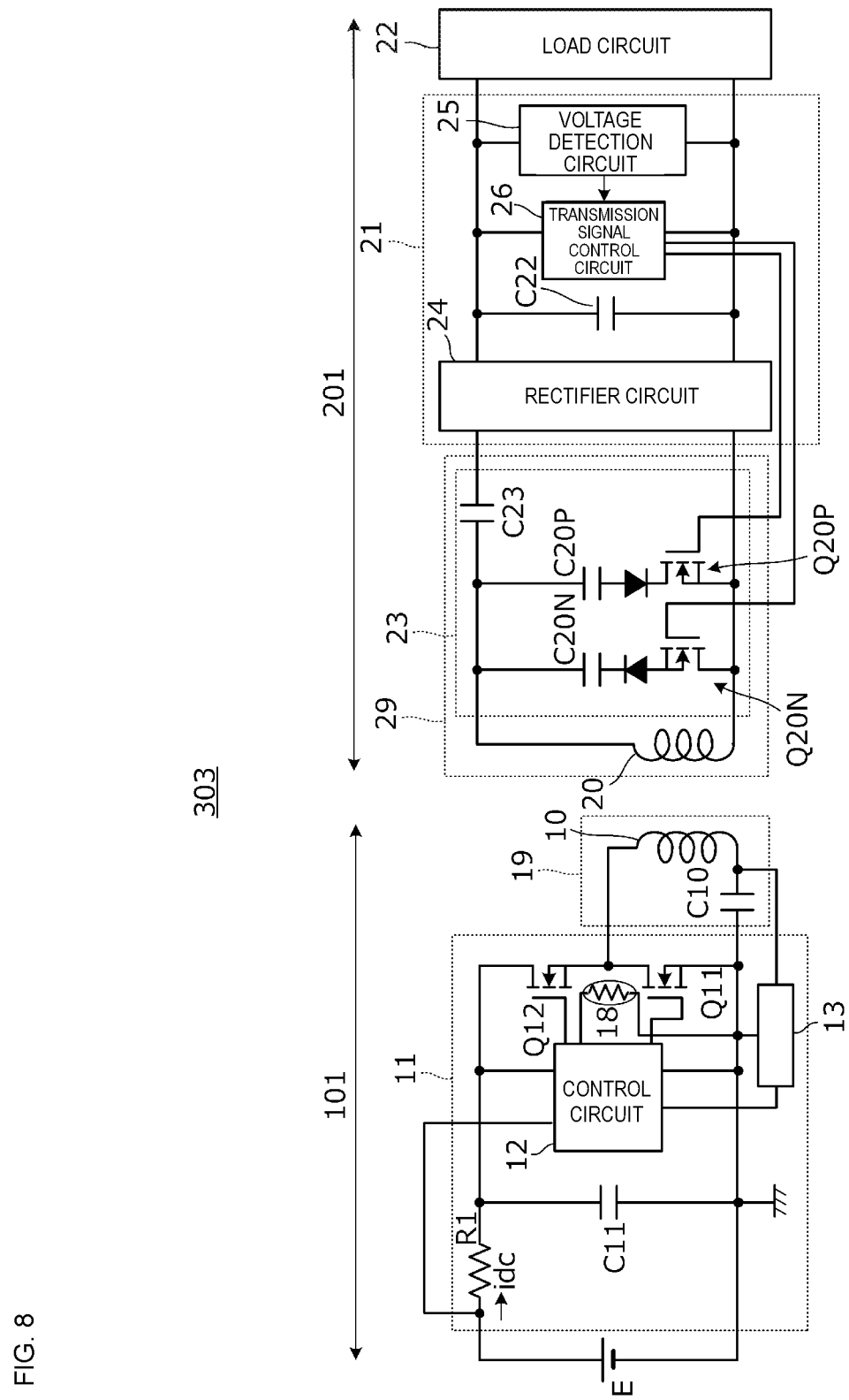
FIG. 8 is a circuit diagram of a wireless power supply system according to a third embodiment.

FIG. 8 is a circuit diagram of a wireless power supply system 303 according to the third embodiment. The wireless power supply system 303 differs from the wireless power supply system 301A illustrated in FIG. 1 in the configuration of the resonance modulation circuit 23 in the power reception device 201. The resonance modulation circuit 23 in the wireless power supply system 303 includes switch elements Q20P and Q20N and capacitors C20P, C20N, and C23. The power reception coil 20, capacitors C20P, C20N, and C23, and switch elements Q20P and Q20N constitute the resonance modulation circuit. The capacitors C20P, C20N, and C23 are one example of "resonant capacitor" according to the present disclosure. Resonance current flows in the capacitor C23 via the rectifier circuit 24. When the switch elements Q20P and Q20N are in an off state, the resonant frequency is determined mainly by the capacitance of the capacitor C23 and the inductance of the power reception coil 20. When the switch elements Q20P and Q20N are in an on state, the resonant frequency is determined mainly by the parallel combined capacitance of the capacitors C20P, C20N, and C23 and the inductance of the power reception coil 20.

As in the present embodiment, one or more resonant capacitors (capacitor C23) in the resonance modulation circuit 23 may be connected in series to the rectifier circuit.

Fourth Embodiment

In a fourth embodiment, several examples of the rectifier circuit included in the power reception device are illustrated.

Figure 9A:
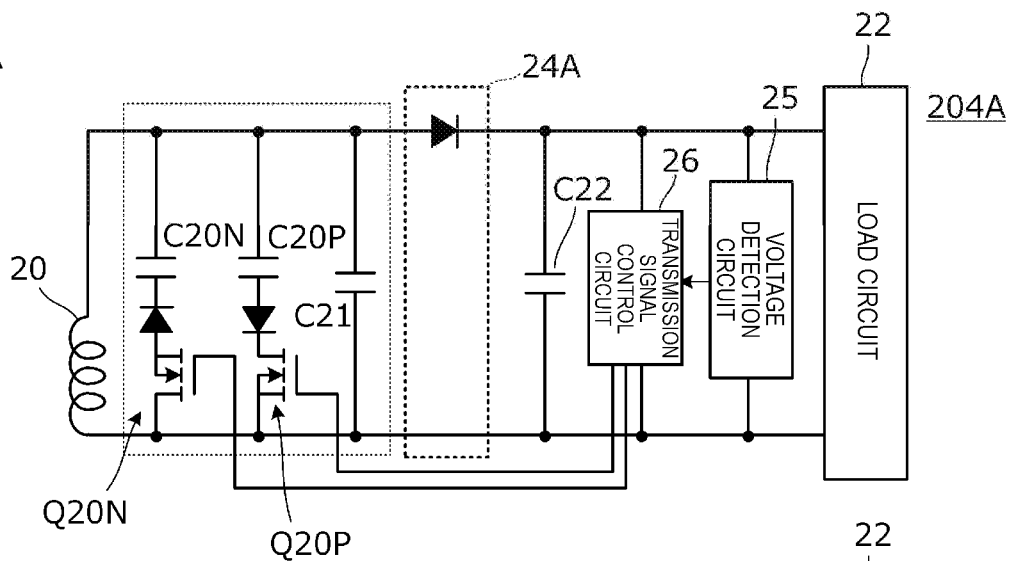
FIG. 9A is a circuit diagram of a power reception device according to a fourth embodiment.
Figure 9B:
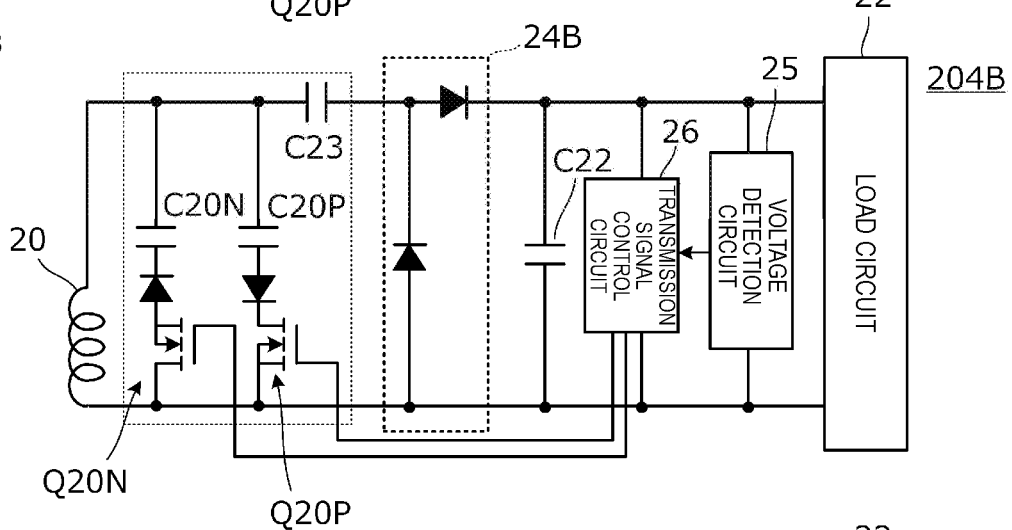
FIG. 9B is a circuit diagram of a power reception device according to the third embodiment.
Figure 9C:
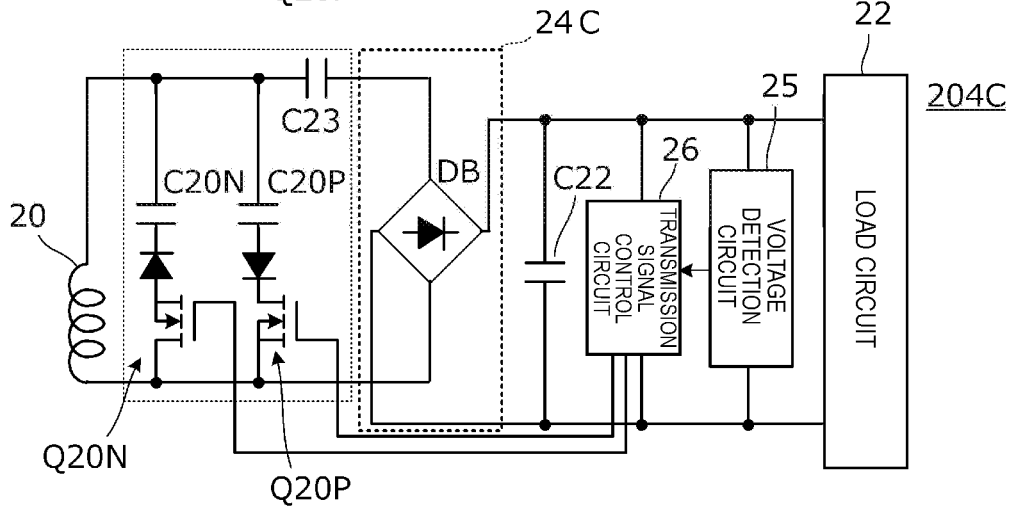
FIG. 9C is a circuit diagram of a power reception device according to the third embodiment.

FIG. 9A is a circuit diagram of a power reception device 204A according to the fourth embodiment, FIG. 9B is a circuit diagram of a power reception device 204B according to the fourth embodiment, and FIG. 9C is a circuit diagram of a power reception device 204C according to the fourth embodiment.

A rectifier circuit 24A included in the power reception device 204A is a half-wave rectifier circuit based on a diode D1. A rectifier circuit 24B included in the power reception device 204B is a voltage doubler rectifier circuit based on diodes D1 and D2. A rectifier circuit 24C included in the power reception device 204C is a full-wave rectifier circuit based on a diode bridge DB.

As illustrated in the present embodiment, the power reception device may include various rectifier circuits. When it includes a half-wave rectifier circuit, as in the power reception device 204A, all of the resonant capacitors C20P, C20N, and C21 may preferably be connected in parallel with the power reception coil 20 to allow resonance current to flow for both waves. When it includes a voltage doubler rectifier circuit, as in the power reception device 204B, or when it includes a full-wave rectifier circuit, as in the power reception device 204C, because resonance currents of both waves flow in the rectifier circuit, the capacitor C23, which is one of the resonant capacitors, may be connected in series to the power reception coil 20.

In the above-described embodiments, examples in which a connection circuit of capacitors and a switch circuit constitutes a variable capacity circuit are illustrated. The variable capacity circuit may be formed of a circuit including a variable capacity element whose capacitance is changed by control voltage.

In the above-described embodiments, transmission of information (transmission signal) from the power reception device to the power transmission device is carried out by changing the state where the electromagnetic resonance condition is satisfied or not. The transmission of information (transmission signal) from the power reception device to the power transmission device is not limited to the above examples. The information (transmission signal) may be exchanged by using wireless modules incorporated in both of the power reception device and power transmission device.

In the above-described embodiments, the power transmission device is illustrated as a device dedicated for power transmission, and the power reception device is illustrated as a device dedicated for power reception. If each of the devices includes a power transmission circuit and a power reception circuit, power supply and exchange of transmission signals can be bidirectional.

Lastly, the above description about the embodiments is illustrative in all respects and is not restrictive. Modifications and changes may be made by those skilled in the art. The scope of the present disclosure is indicated by the claims, not the above-described embodiments. The scope of the present disclosure embraces changes from the embodiments within a scope equivalent to the scope of the claims.

What is claimed is:

1. A wireless power supply system comprising:
   a power transmitter including a power transmission coil and a power transmission circuit configured to supply high-frequency power to the power transmission coil; and
   a power receiver including a power reception coil coupled to the power transmission coil, a power reception circuit configured to convert high-frequency power received by the power reception coil into direct-current power, and a load circuit configured to consume the direct-current power,
   wherein
   the power receiver includes a load detector configured to detect a state of a load, a signal generator configured to generate a transmission signal to be directed to the power transmitter on the basis of a result of detection by the load detector, and a transmission-signal control circuit configured to transmit the transmission signal by using coupling between the power transmission coil and the power reception coil,
   the power transmitter includes a demodulation circuit configured to demodulate the transmission signal, an output detector configured to detect power output by operation of the power transmission circuit, a temperature detector configured to detect temperature of a heating portion of the power transmitter, and a control circuit configured to control the power transmission circuit, and
   the control circuit causes the power transmission circuit to operate, by using a pulse-density modulation control method of controlling a flow of power by changing density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in a state where a value detected by the output detector reaches a predetermined value, and De3 indicates the pulse density in a state where a value detected by the temperature detector reaches a predetermined value.

2. The wireless power supply system according to claim 1, further comprising a power transmission resonant capacitor constituting a power transmission resonant circuit together with the power transmission coil, and a power reception resonant capacitor constituting a power reception resonant circuit together with the power reception coil,
   wherein
   the signal generator includes a resonance modulation circuit configured to change input impedance seen from the power transmission circuit toward the load circuit and switch a state where an electromagnetic resonance condition based on electromagnetic coupling between the power transmission resonant circuit and the power reception resonant circuit is satisfied or not, and
   the demodulation circuit demodulates the transmission signal on the basis of a variable that varies in accordance with the state where the electromagnetic resonance condition is satisfied or not.

3. The wireless power supply system according to claim 1, wherein
   the power reception circuit includes a rectifying and smoothing circuit configured to covert voltage occurring in the power reception coil into direct-current voltage, and
   the load detector detects the state of the load on the basis of the direct-current voltage.

4. The wireless power supply system according to claim 1, wherein the control circuit restricts oscillation by comparing the value detected by the temperature detector with a predetermined threshold in advance of restricting oscillation by comparing the value detected by the output detector with a predetermined output value.

5. The wireless power supply system according to claim 1, wherein the control circuit restricts oscillation by comparing the value detected by the output detector with a predetermined output value in advance of restricting oscillation by comparing the value detected by the temperature detector with a predetermined temperature value.

6. The wireless power supply system according to claim 2, wherein
   the power reception circuit includes a rectifying and smoothing circuit configured to covert voltage occurring in the power reception coil into direct-current voltage, and
   the load detector detects the state of the load on the basis of the direct-current voltage.

7. The wireless power supply system according to claim 2, wherein the control circuit restricts oscillation by comparing the value detected by the temperature detector with a predetermined threshold in advance of restricting oscillation by comparing the value detected by the output detector with a predetermined output value.

8. The wireless power supply system according to claim 3, wherein the control circuit restricts oscillation by comparing the value detected by the temperature detector with a predetermined threshold in advance of restricting oscillation by comparing the value detected by the output detector with a predetermined output value.

9. The wireless power supply system according to claim 6, wherein the control circuit restricts oscillation by comparing the value detected by the temperature detector with a predetermined threshold in advance of restricting oscillation by comparing the value detected by the output detector with a predetermined output value.

10. The wireless power supply system according to claim 2, wherein the control circuit restricts oscillation by comparing the value detected by the output detector with a predetermined output value in advance of restricting oscillation by comparing the value detected by the temperature detector with a predetermined temperature value.

11. The wireless power supply system according to claim 3, wherein the control circuit restricts oscillation by comparing the value detected by the output detector with a predetermined output value in advance of restricting oscillation by comparing the value detected by the temperature detector with a predetermined temperature value.

12. The wireless power supply system according to claim 6, wherein the control circuit restricts oscillation by comparing the value detected by the output detector with a predetermined output value in advance of restricting oscillation by comparing the value detected by the temperature detector with a predetermined temperature value.

13. A wireless power transmitter constituting a wireless power supply system together with a power receiver, the power receiver including a power reception coil, a power reception circuit configured to convert high-frequency power received by the power reception coil into direct-current power, a load circuit configured to consume the direct-current power, a load detector configured to detect a state of the load circuit, a signal generator configured to generate a transmission signal on the basis of a result of detection by the load detector, and a transmission-signal control circuit configured to transmit the transmission signal by using the power reception coil, the wireless power transmitter comprising:
- a power transmission coil coupled to the power reception coil;
- a power transmission circuit configured to supply high-frequency power to the power transmission coil;
- a demodulation circuit configured to demodulate the transmission signal;
- an output detector configured to detect power output by operation of the power transmission circuit;
- a temperature detector configured to detect temperature of a heating portion of the power transmission circuit; and
- a control circuit configured to control the power transmission circuit, wherein the control circuit causes the power transmission circuit to operate, by using a pulse-density modulation control method of controlling a flow of power by changing density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in a state where a value detected by the output detector reaches a predetermined value, and De3 indicates the pulse density in a state where a value detected by the temperature detector reaches a predetermined value.

14. A wireless power receiver constituting a wireless power supply system together with a power transmitter:

the power transmitter comprising:
- a power transmission coil, a power transmission resonant capacitor constituting a power transmission resonant circuit together with the power transmission coil, a power transmission circuit configured to supply high-frequency power to the power transmission coil, a demodulation circuit configured to demodulate a transmission signal, an output detector configured to detect power output by operation of the power transmission circuit, a temperature detector configured to detect temperature of a heating portion, and a control circuit configured to cause the power transmission circuit to operate, by using a pulse-density modulation control method of controlling a flow of power by changing density of oscillation pulses for a predetermined period of time, in relationship De1>De2>De3 for pulse densities De1, De2, and De3, where De1 indicates the pulse density determined on the basis of a result of demodulation by the demodulation circuit, De2 indicates the pulse density in a state where a value detected by the output detector reaches a predetermined value, and De3 indicates the pulse density in a state where a value detected by the temperature detector reaches a predetermined value, the wireless power receiver comprising:
- a power reception coil coupled to the power transmission coil; a power reception resonant capacitor constituting a power reception resonant circuit together with the power reception coil; a power reception circuit configured to convert high-frequency power received by the power reception coil into direct-current power; a load circuit configured to consume the direct-current power; a load detector configured to detect a state of a load; a signal generator configured to generate the transmission signal to be directed to the power transmitter on the basis of a result of detection by the load detector; a transmission-signal control circuit configured to transmit the transmission signal by using coupling between the power transmission coil and the power reception coil; and
- a resonance modulation circuit configured to change input impedance seen from the power transmission circuit toward the load circuit and switch a state where an electromagnetic resonance condition based on electromagnetic coupling between the power transmission resonant circuit and the power reception resonant circuit is satisfied or not, and
- the transmission-signal control circuit converts the transmission signal into an amount of change in the input impedance for a fixed period of time in temporal change and control the resonance modulation circuit.

* * * * *